H. Kendall,
Cheese Press,
Nº 21,883. Patented Oct. 26, 1858.
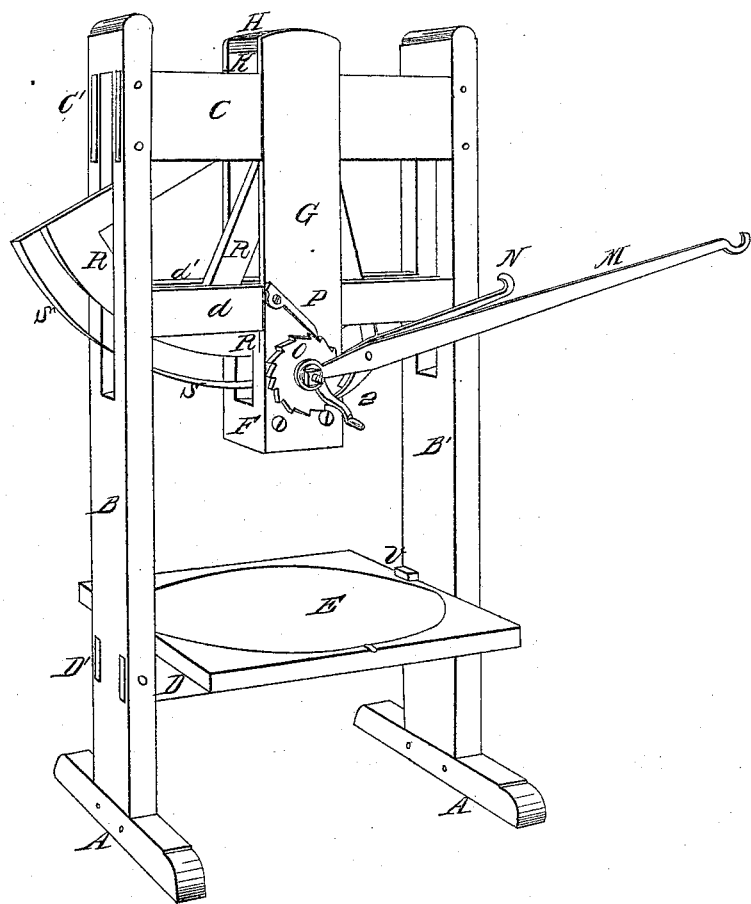

UNITED STATES PATENT OFFICE.

H. KENDALL, OF EAST DORSET, VERMONT.

CHEESE-PRESS.

Specification of Letters Patent No. 21,883, dated October 26, 1858.

*To all whom it may concern:*

Be it known that I, HARTWELL KENDALL, of East Dorset, in the county of Bennington and State of Vermont, have invented a new and useful Machine, which I denominate a "Universal Antifriction Press," designed for the use of cheese and cider makers, bookbinders, and others; and I do hereby declare that the following is a full, clear, and exact description of the same, reference being had to the annexed drawing, making part of this specification, which is a perspective view of the press as I construct it for a cheese-press.

(A A' B B' C C') is a frame made of strong hard wood, five feet high and two and a half, wide; (A A') the foot pieces, are four inches square and two feet long, and serve to support the whole machine, and keep it in an upright position; (B, B') the side pieces are five feet long, six inches wide, and three inches thick. They are secured to the foot pieces (A A') by means of mortise and tenon, and are perforated in the upper part with a long narrow opening, so as to allow the eccentric (R), in its movements, freely, to pass through them, as represented.

(C C') are cross pieces framed into the side pieces (B B') by mortise and tenon near the top as represented. They are two and a half feet long, from shoulder to shoulder, eight inches wide and two inches thick.

(D D') are cross pieces similar to (C C'); (they may be somewhat less in width;) and secured to the side pieces (B B') in the same manner, near the bottom.

(d d') are cross pieces similar to (D D'), only of somewhat smaller dimensions, and they are secured to the side pieces (B B') in any convenient manner.

(E) is the cheese board which rests upon the cross peices (D D'), as represented.

(F G H K) is a sliding frame, the sides (G and K) of which are formed of plank, one inch and a half thick, six inches wide and three feet long. They are secured at the lower end by bolts to the block (F), which is formed as represented; and at the upper end to the cross piece (H), in any convenient manner. The side piece (G) is let into the cross pieces (C and d) about half an inch, and the side piece (K) the back side of the machine, is let into the cross pieces (C' and d') in the same manner, so that the whole frame (F G H K) is susceptible only of an upward and downward movement in a right line.

(L) is a shaft of inch and a half round iron, which passes through the lower part of the sliding frame (F G H K) just beneath the periphery of the eccentric (R). It is furnished with a ratchet wheel (O), a lever (M), and pawl (N), a crank (Q) and a dog (P) the arrangement and office of which will be readily understood by a glance at the drawings; (R) the eccentric should be made of cast iron. It may be an entire circle or only a part of one. When a quadrantal portion is used, as represented in the drawing, it should be of about two feet radius and hung by means of a pin or otherwise to the cross pieces (c c'), as represented. The difference between the longest and shortest radius should be about four inches. The increase of radius from the shortest to the longest, should be gradual, but not uniform, *i. e.*, about two thirds of the increase should be contained in the first half of the periphery. This eccentric is furnished with a strap or rim of iron (S) which passes just below the shaft (L) and serves to retain it in close proximity to the periphery of the eccentric.

(T) is a pin in the side of the sliding frame (F G H K) by means of which the pawl (N) and lever (M) may be hitched up out of the way when not in use. The pawl (N) has a hook at the end for that purpose.

(V) is a small block of wood fastened, in any convenient manner, to the side piece (P',), just above the cheese board (E) to prevent it from tipping up when drawn forward to adjust or arrange the cheese or loaf. There is one on sidepiece (B) (not shown) in a similar position and for the same purpose.

If anything about the arrangement or proportion of the machine is not fully understood, it may be readily learned from inspection or measurement of the drawing, which is accurately made from a model of one eighth the size of a working machine.

The press may be constructed of different sizes and proportions according to the purposes for which it is to be used.

Operation: The cheese being supposed to be in the press, and the eccentric (R) turned to the extreme left so as to bring the sliding frame (F G H K) to its highest position, the attendant, by means of blocks, pieces of plank, or something of the kind, will fill up the space between the press-board, or follower, and the lower end of the sliding frame (F G H K) and then by applying the hand to the crank (Q) turn it around in a right hand direction, which will have the effect, the shaft (L) being in contact with the periphery of the eccentric (R), to draw it around from left to right, and thereby force the sliding frame (F G H K) downward. Having rolled it into the position represented in the drawing, it will probably be necessary to apply the weight which can be readily done by arranging the lever (M) and pawl (N) in the position represented and hanging it on. Then by attaching the machine in the usual manner, it will be found that the operation of pressing will go on admirably.

I do not claim applying the power either directly to the eccentric or through the same, by means of additional gearing; but

What I claim as my invention and desire to secure by Letters Patent, is—

Applying the power through the sliding frame (F, G, H, K,) by means of the ratchet-wheel O, and the pawls, lever and crank connected therewith, or their equivalents, so that the shaft of said ratchet-wheel shall act upon, and move, the eccentric, at the same time, serving as an anti-friction roller; whereby simplicity, lightness, and compactness of construction, and greater efficiency of action are secured, as herein specified.

HARTWELL KENDALL.

In presence of—
 BLAKE BARROWS,
 LEWIS WILLIAMS.